United States Patent [19]
Iimura

[11] Patent Number: 6,036,329
[45] Date of Patent: *Mar. 14, 2000

[54] FLAT LIGHT SOURCE AND PASSIVE DISPLAY UTILIZING BYPASS LIGHT GUIDE

[76] Inventor: Keiji Iimura, 10-8, Akatsuka 3-Chome, Itabashi-ku Tokyo, 175-0092, Japan

[*] Notice: This patent is subject to a terminal disclaimer.

[21] Appl. No.: 09/268,861

[22] Filed: Mar. 15, 1999

Related U.S. Application Data

[62] Division of application No. 08/805,699, Feb. 25, 1997, Pat. No. 5,913,594.

[51] Int. Cl.[7] .......................... G01D 11/28; G02F 1/1335
[52] U.S. Cl. .................. 362/31; 362/26; 349/67
[58] Field of Search ................. 362/31, 26, 223, 362/27, 29, 554, 561, 559, 551; 349/65, 67, 61, 62, 63

[56] References Cited

U.S. PATENT DOCUMENTS 5,410,454  4/1995  Murase ........................................ 362/31

*Primary Examiner*—Sandra O'Shea
*Assistant Examiner*—Marshall Honeyman

[57] ABSTRACT

A flat light source i.e. a surface light source and a passive display using the same are disclosed, capable of making optimal light leakage with uniform brightness across the entire area of its large flat surface. The flat light source comprises a first light transmission means for illumination with relatively high refractive index, a second light transmission means for bypass light guide including at least one light guide having relatively high refractive index and a light coupling means making light coupling between the both first and light transmission means for changing direction of light rays, wherein the light rays output from the second light transmission means are changed in direction in order to input into the first light transmission means. A plurality of optical fibers may be used as the light-guides for light bypassing, in which they are aligned at least in one line in the second light transmission means, by which almost all incident light rays can be transmitted along entire length of the second light transmission means with minimized loss. The light coupling means may be composed of at least one optical element with high reflective index, having a cross-sectional shape selected from a group of a trapezoidal, a triangular, a half-circular and a "U" shape. The first light transmission means may have a first terminal surface and the second light transmission means may have a second terminal surface. A common i.e. single light generating means may be provided in order to project light rays to the first terminal surface and/or the second light transmission means.

25 Claims, 17 Drawing Sheets

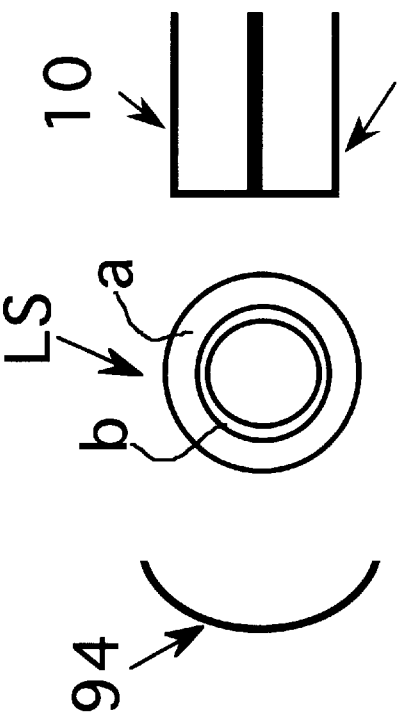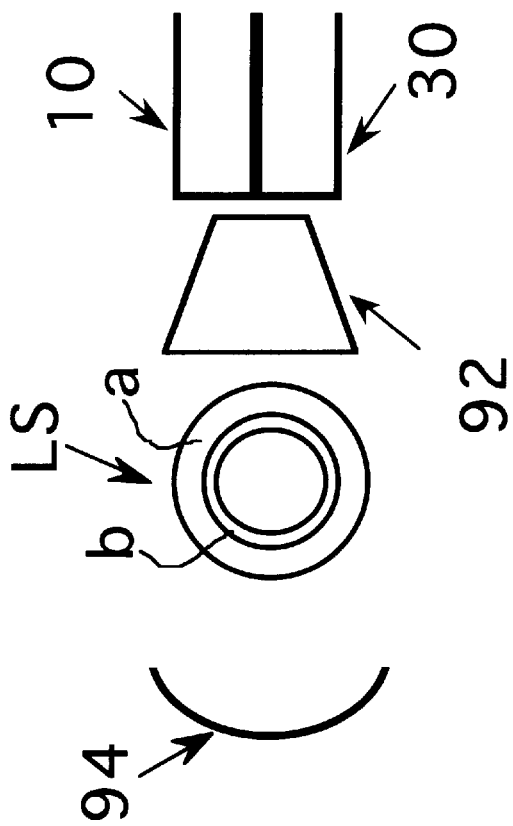

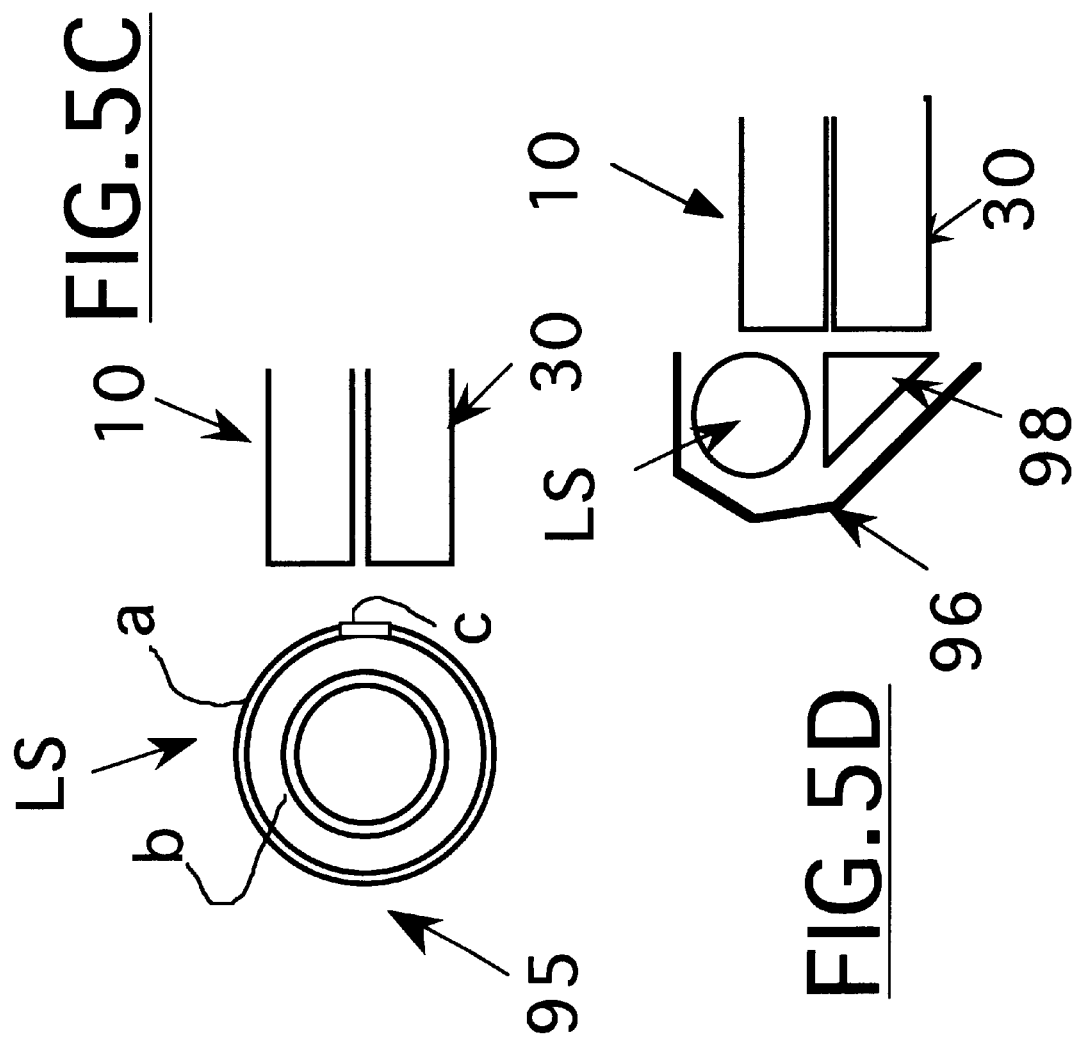

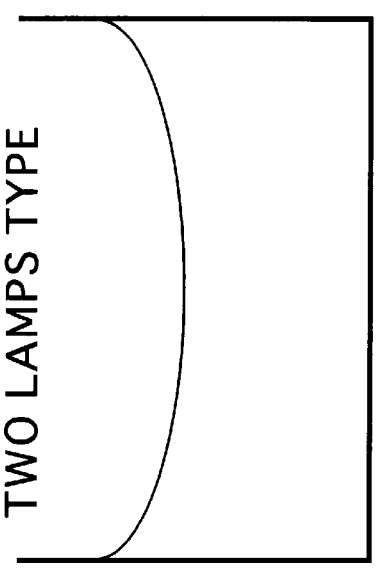

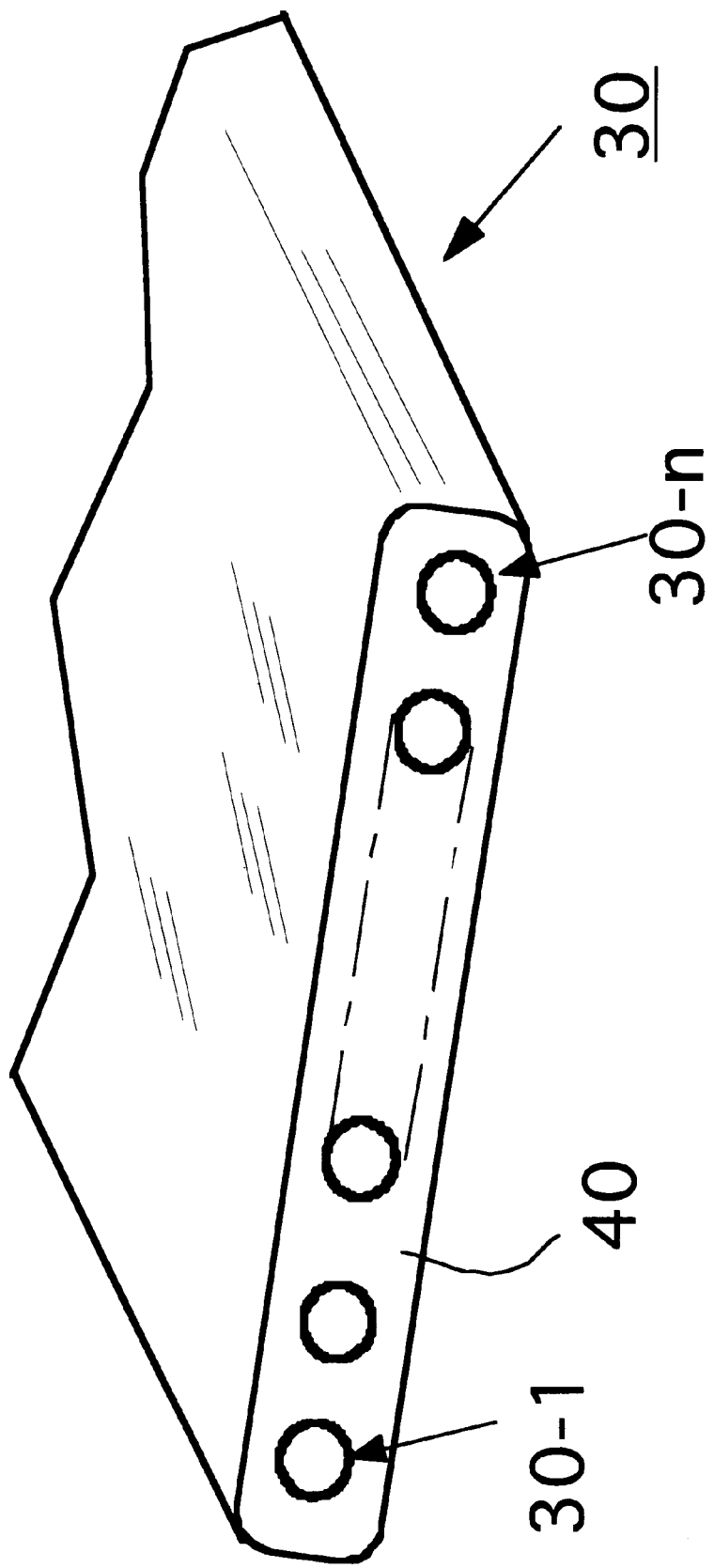

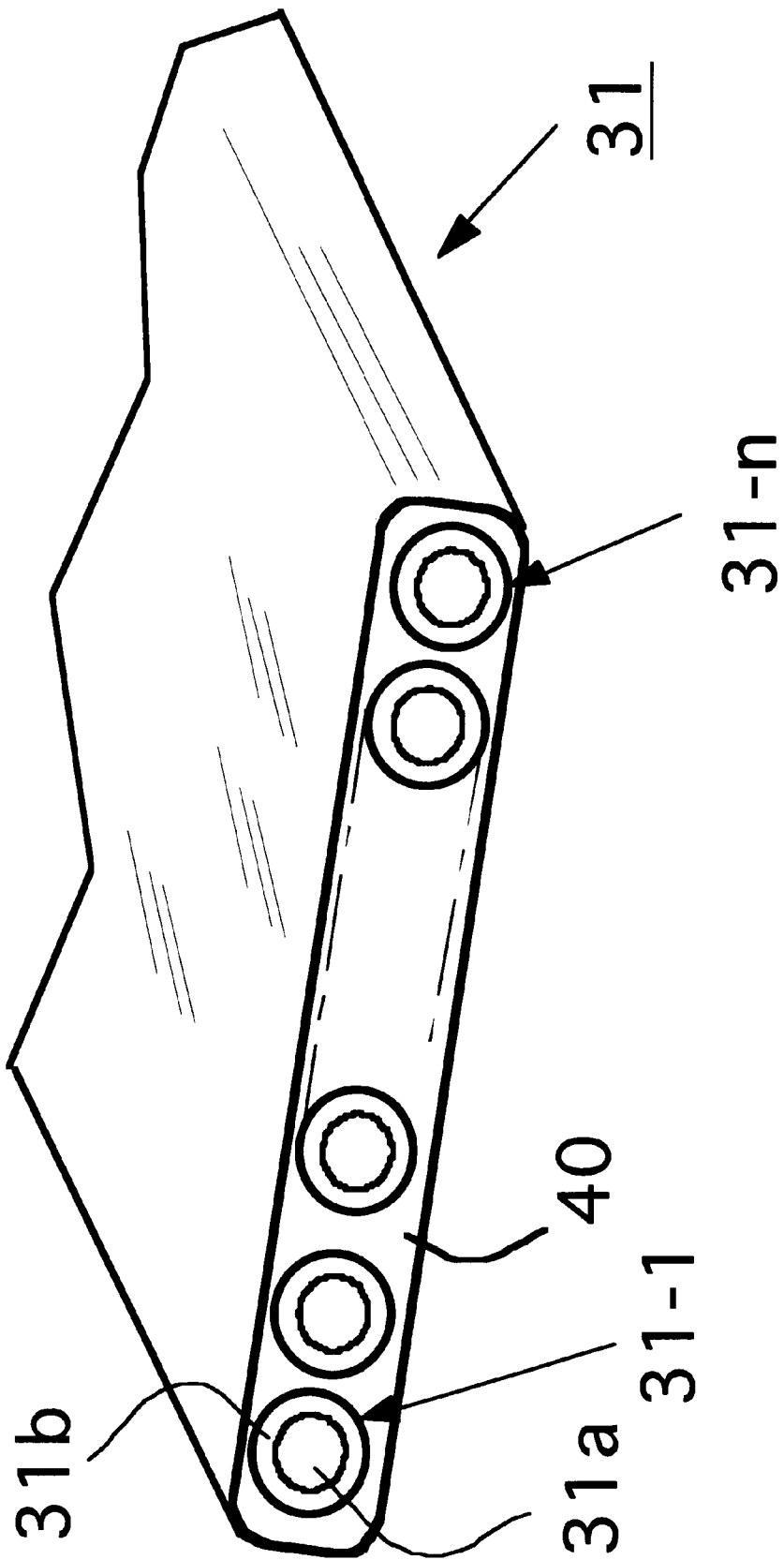

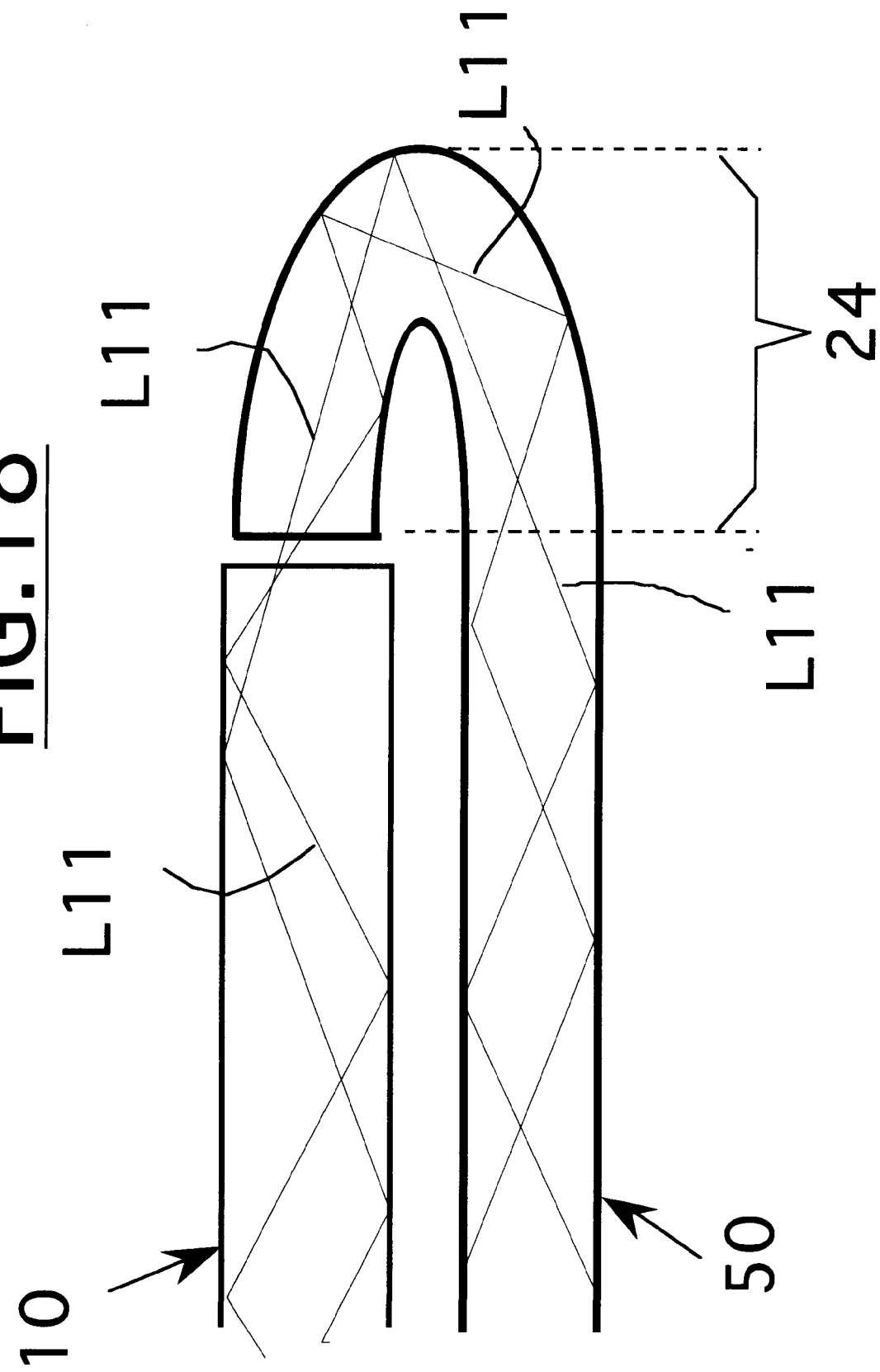

FLAT LIGHT SOURCE AND PASSIVE DISPLAY UTILIZING BYPASS LIGHT GUIDE

This is a divisional application of U.S. patent application Ser. No. 08/805,699, Filing date; Feb. 25, 1997, Entitled "FLAT PANEL TYPE LIGHT SOURCE DEVICE AND PASSIVE DISPLAY DEVICE UTILIZING THE LIGHT SOURCE DEVICE" now U.S. Pat. No. 5,913,594.

BACKGROUND OF INVENTION

1. Technical Field

This invention relates generally to a flat panel type light source device, widely used for general lighting or illumination, or for a back-light illuminating a passive type display device such as a liquid crystal display device. More particularly, this invention relates to a flat panel type light source device using edge light effect in which multiple reflection of light rays are carried out between front and rear surfaces of a light transmission panel.

Furthermore, this invention generally relates to the passive type display devices with a flat panel type light source device for use on a back-light illuminating the passive type display device and more particularly to the passive type display device providing the flat panel type light source device using the edge light effect.

2. Description of Prior Art

A liquid crystal display is a typical example of passive type displays which do not emit light by them selves, different from active type displays which emit light by them selves such as CRT's and electro-luminescences. Accordingly, the liquid crystal displays of transmissive type instead of reflective type are utilized in combination with the surface or flat type light source or light transmission panel for back light which is located in rear of such display, so that it can be clearly observed by an observer in a dark place as well as a bright place.

In accordance with the prior art, such a light transmission panel is widely used in the market for the flat type light sources as back-lights or film viewers to illuminate the passive type displays such as a liquid crystal display of transmissive type or a transparent picture film such as photographic film, by combination with a light source such as fluorescent lamp or lamps of straight line type, located at side surface of the light transmission panel.

This type of lighting system is called as edge-lighting or light transmission panel system, wherein the light transmission panel is made from transparent materials with high light transmission characteristics such as acrylic resin, polycarbonate resin or glass. Light rays emitted from light source are input to side surface of the light transmission panel. Such light rays repeat multiple reflection between front and rear surfaces in the light transmission panel. The light rays leak or output gradually according to transmission of light rays to illuminate an object such as the liquid crystal display or the picture film.

The light transmission panel is ordinarily of panel or film having rectangular illumination surface area substantially corresponding to that of the liquid crystal display.

The light transmission panel for illumination has rectangular surfaces with a pair of long sides and a pair of short sides. There are following four types of arrangement according to positioning between the light transmission panel and the line light source such as fluorescent lamp of straight line type;

(1) An arrangement of short side-one light type is such that one line light source is placed at a short side surface of the light transmission panel.

(2) An arrangement of long side-one light type is such that one line light source is placed at a long side surface of the light transmission panel.

(3) An arrangement of short side-two lights type is such that two line light sources are placed at two short side surfaces in the light transmission panel.

(4) An arrangement of long side-two lights type is such that two line light sources are placed at two long side surfaces in the light transmission panel.

As well known in this field, incident light rays into the light transmission panel for illumination are transmitted inside the light transmission panel and the light rays repeat multiple internal reflection from a light incident side toward an opposite side in the light transmission panel. Some amount of transmitted light rays reach until the opposite side in the light transmission panel. The rest of transmitted light rays leak little by little from surface of the light transmission panel for illumination to outside of the light transmission panel to illuminate the passive type display or the picture film.

Accordingly, in case of the short side-one light type or long side-one light type, brightness of surface projecting from surface of the light transmission panel is decreased extremely according to distance apart from location of the light source.

Such one light types can not obtain uniform surface brightness and have lower surface brightness according to distance apart from location of the light source.

In case the light transmission panel with large surface area is required for illumination, the one light types can not be used because distance to be transmitted is too long and brightness of surface is extremely low, near opposite side terminal far from light input side in the light transmission panel.

Therefore, the one light types are limited in usage for the liquid crystal displays of color indication type with small surface area or that of monochrome indication type not requiring relatively high and uniform surface brightness.

The two lights types are used for the liquid crystal displays of color and monochrome indication types with large surface area requiring relatively high and uniform surface brightness, such as monitors or displays for personal computers or television receivers.

Especially, movable electronic devices driven by battery power source having the liquid crystal display with back-light require light weight or compact size, such as for personal computers and information & telecommunication terminals of note or handy size.

The two lights type using fluorescent lamps is not suitable for this purpose, because weight is almost double and housing space to accommodate lamps is almost double compared with one light type.

The fluorescent lamps decrease brightness and uniformity of emission at different surface spots on the lamp surface, because blackened area increases from electrodes toward a center of the lamp according to a lapse of time, as known in fluorescent lamps for general lighting purpose. And blackened area is increasing according to a lapse of time and the blackened area differs by each different lamp.

Therefore, in two lights type using the fluorescent lamps, uniformity is decreasing in brightness and displayed color at different spots on the surface of light transmission panel according to a lapse of time, compared with one light type.

SUMMARY OF THE INVENTION

An object of this invention is to provide a flat panel type light source device (i.e. a flat light source) or a surface light source device, having uniform brightness of surface in a light transmission panel for illumination, utilizing an edge-light effect.

A further object of this invention is to provide a passive type display device with a flat panel type light source device, having uniform brightness of surface in a light transmission panel for illumination and to provide the passive type display device, using the edge-light effect.

According to one preferred embodiment of this invention, a flat light source comprises a first light transmission means, being for use for illumination only, with relatively high refractive index and relatively high light transmission characteristics; a second light transmission means, being for use as bypass light guide only, including a plurality of light-guides, wherein each of the light-guides has relatively high refractive index and relatively high light transmission characteristics; and a light coupling means, making light coupling between the second light transmission means and the second light transmission means for changing direction of light rays, wherein the light rays output from the second light transmission means are changed in direction in order to input into the first light transmission means.

According to another preferred embodiment of this invention, a passive display, comprising: a flat panel type passive display; and a flat light source; wherein said flat panel type light source device, further composing; a flat light source comprises a first light transmission means, being for use for illumination only, with relatively high refractive index and relatively high light transmission characteristics; a second light transmission means, being for use as bypass light guide only, including a plurality of light-guides, wherein each of the light-guides has relatively high refractive index and relatively high light transmission characteristics; and a light coupling means, making light coupling between the second light transmission means and the second light transmission means for changing direction of light rays, wherein the light rays output from the second light transmission means are changed in direction in order to input into the first light transmission means.

The first light transmission panels are used for illumination which have relatively high refractive index and relatively high light transmission characteristics, as same as used in the prior art, in which an edge-light type lighting is applied. After light rays are projected from a light source to side terminals in both light transmission panels, they are input into the side terminals in both light transmission panels. And the light rays are transmitted inside the both light transmission panels toward the opposite side terminal, by reflecting repeatedly between a front surface and a rear surface in the both light transmission panels.

In addition to the light transmission panels for illumination in the prior art, this embodiment uses an additional light transmission panel for bypass light guide which is comprised of a multiple of light-passageways with relatively high refractive index and relatively high light transmission characteristics, differing from the light transmission panel for illumination. Both light transmission panels for illumination and for bypass light-guide are located adjacently in parallel. A light coupling means is provided to make an optical coupling between both light transmission panels. And the light coupling means is located near a pair of side terminals in the both light transmission panels distant from another pair of side terminals in the both panels, and incident light rays are input into the another pair of side terminals.

Therefore, only one common( i.e. a single )light source can project or input the light rays into a pair of side terminals in both light transmission panels for illumination and also for bypass light guide.

The incident light rays are transmitted inside first light transmission panel for illumination toward the opposite side terminal, by reflecting repeatedly between front surface and rear surface in the light transmission panel for illumination, some amount of the incident light rays leaks gradually from the surface of first light transmission panels and outputs to outside to illuminate an object such as passive type display or picture film.

On the other hand, in a preferred embodiment of this invention, almost incident light rays are transmitted effectively with minimum leakage of light rays, inside second light transmission panel for bypass light guide toward the opposite side terminal, by reflecting repeatedly between front surface and rear surface in the light transmission panel for bypass light guide, because the second light transmission panel is comprised of the multiple of light passageways with relatively high refractive index and relatively high light transmission characteristics.

Such transmission light rays, after bypassed and reached to opposite side terminal in the second light transmission panel, are input into opposite side terminal in the first light transmission panel, via the light coupling means by optical coupling in which direction of light rays changes to reverse by function of the light coupling means.

The transmission light rays, which are once bypassed and input inside the first light transmission panel for illumination, transmit from opposite side terminal in the first light transmission panel toward another side terminal near the light source in the first light transmission panel. By reflecting repeatedly between the front surface and the rear surface in the light transmission panel for illumination, some amount of the incident light rays leak from the surface of first light transmission panels and output to outside to illuminate an object such as a passive type display or a picture film.

In a preferred embodiment of this invention, the second light transmission panel for bypass light guide has such function that almost incident light rays do not leak, different from the first light transmission panel for illumination.

Therefore this function is equivalent to as if an additional light source exists at the opposite side terminal, far from the another side terminal at which an actual light source exists.

BRIEF DESCRIPTION OF THE DRAWINGS

A complete understanding of this invention may be obtained from the following explanations, in connection with the accompanying drawings; in which:

FIGS. 5A, 5B, 5C, 5D and 5E are schematic side elevational, partially omitted and cross-sectional views, showing various light incident optical means to the first light transmission panel 10 for illumination and the second light transmission panel 30 for bypass light guide from the light source "LS", according to the embodiment of this invention;

FIG. 6 is a graph showing distribution characteristics of brightness on the surface of first light transmission panel 10 according to the preferred embodiment of the invention;

FIG. 7 is a graph showing distribution characteristics of brightness on the surface of light transmission panel in case one lamp source is used according to prior art;

FIG. 8 is a graph showing distribution characteristics of brightness on the surface of light transmission panel in case two lamps source are used according to prior art;

FIG. 9 is a partly omitted, schematic perspective and enlarged view of a second light transmission panel 30 having a first type of multiple optical fibers (or independent light passageways), used in the first preferred embodiment of this invention as shown in FIG. 1 to FIG. 4, for an example;

FIG. 10 is a partly omitted schematic perspective view of another second light transmission panel 31 using a second type of multiple optical fibers;

DESCRIPTION OF THE PREFERRED EMBODIMENTS

Reference is made to FIG. 1, FIG. 2, FIG. 3 and FIG. 4 showing one preferred embodiment of this invention.

Figure 1:
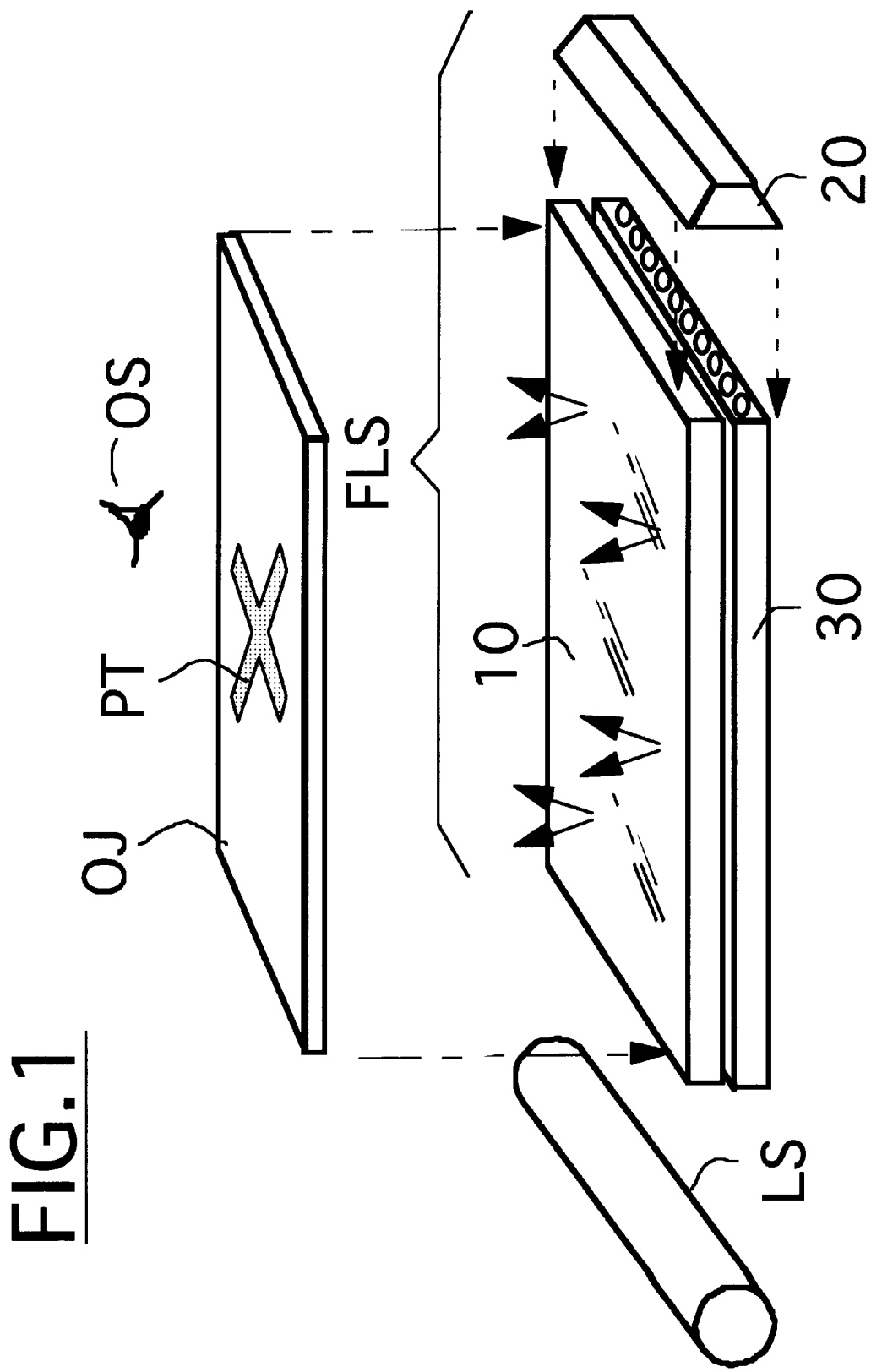
FIG. 1 is an exploded schematic perspective view of a flat panel type light source "FLS" to illuminate an object such as a photographic film, a liquid crystal display device, according to one preferred embodiment of this invention.
Figure 2:
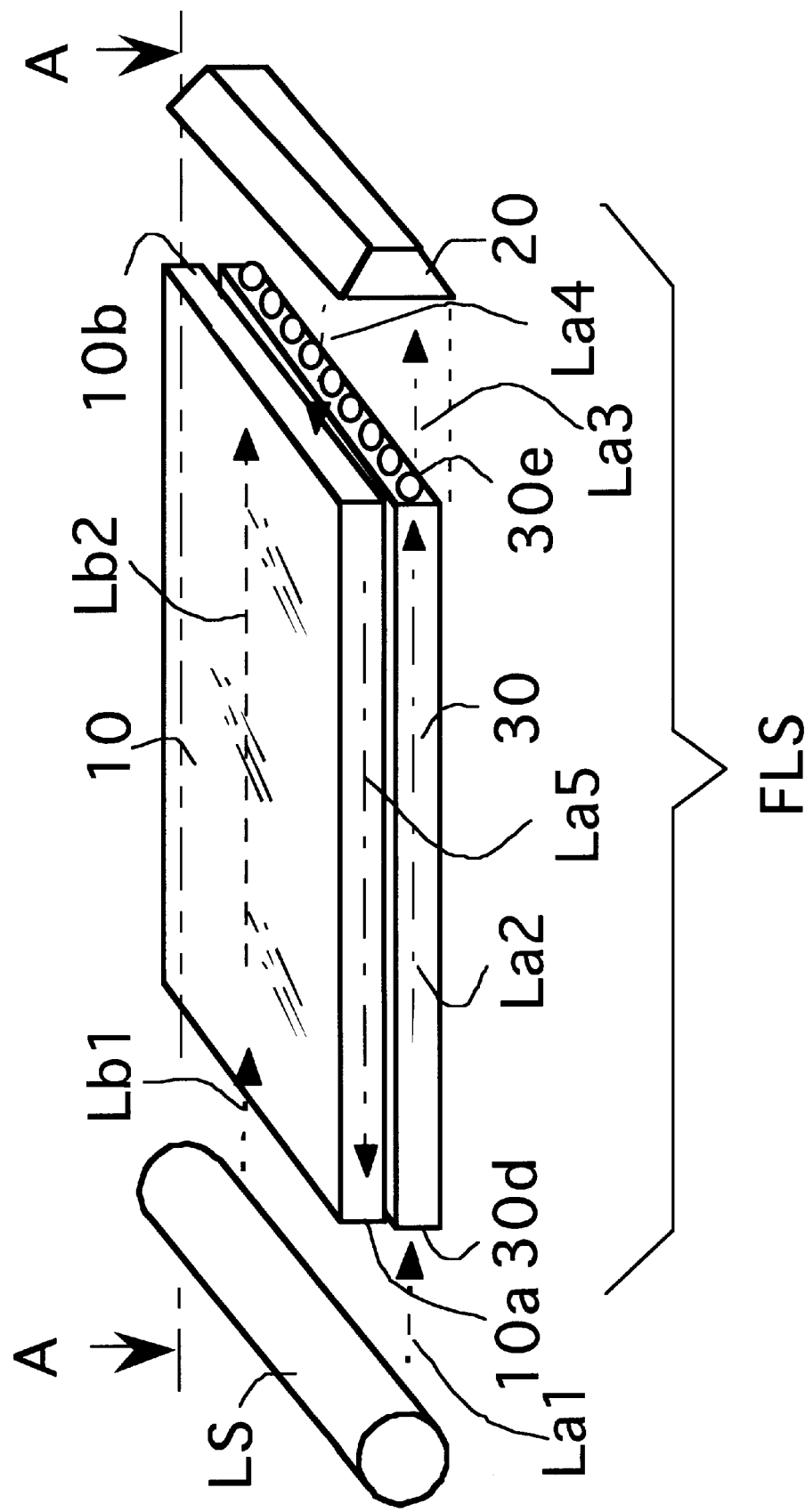
FIG. 2 is a schematic perspective view of a flat panel type light source "FLS" and also showing the transmitting directions of light rays "La1" to "La5" and "Lb1" and "Lb2", according to one preferred embodiment as shown in FIG. 1.
Figure 3:
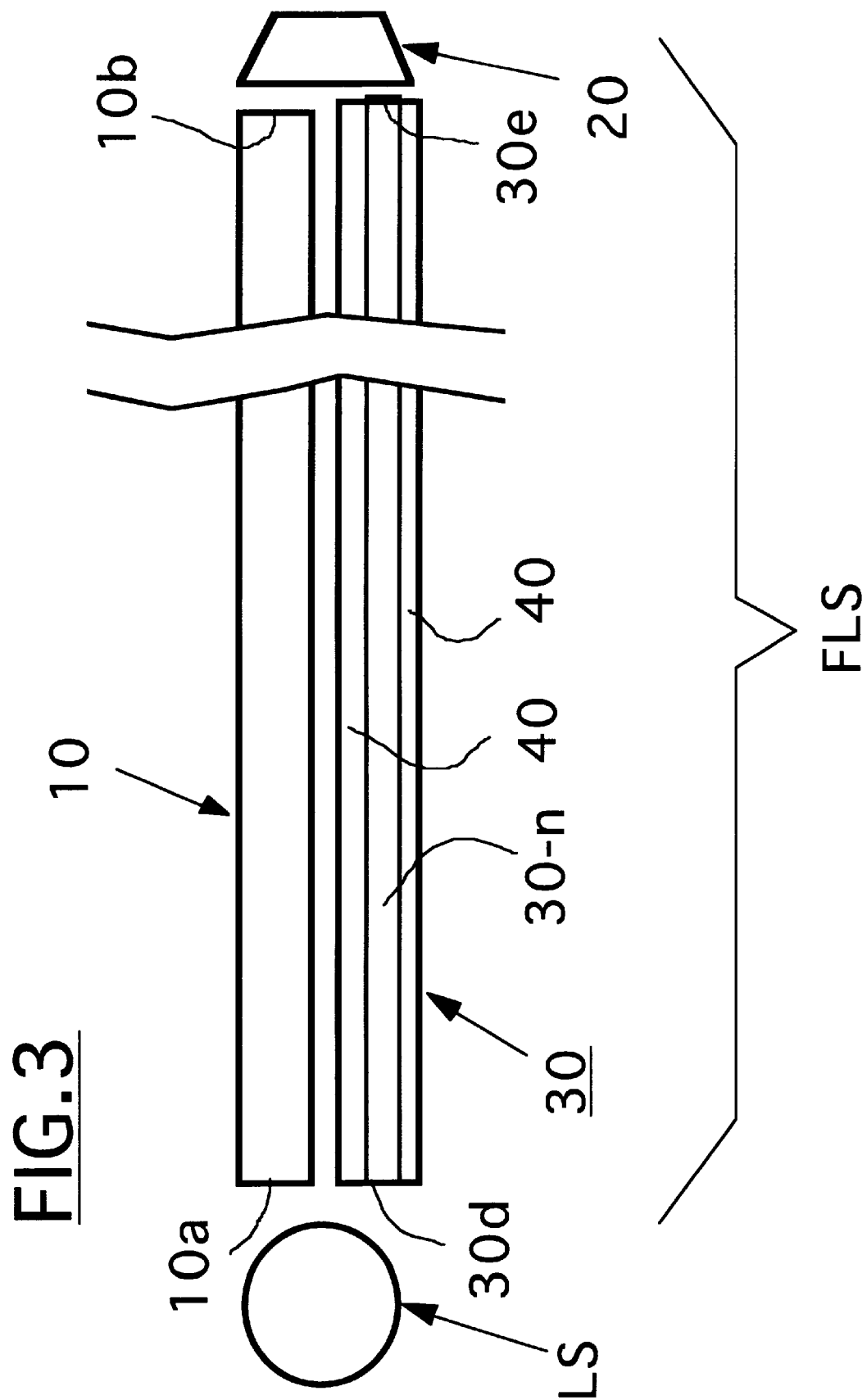
FIG. 3 is an enlarged side elevational, partially omitted and cross-sectional view of a flat panel type light source "FLS", taken along the line A—A of FIG. 2.

FIG. 1 illustrates an exploded schematic perspective view of a flat panel type light source "FLS" to illuminate an object "OJ" such as a photographic film, a liquid crystal display device according to one preferred embodiment of this invention. FIG. 2 illustrates a schematic perspective view of a flat panel type light source "FLS" and also showing transmitting direction of light rays according to one preferred embodiment of this invention. FIG. 3 illustrates an enlarged side elevational, partially omitted and cross-sectional view of the flat panel type light source "FLS" in FIG. 2 taken along the line A—A. And FIG. 4 illustrates an enlarged side elevational view, more enlarged than FIG. 3, showing the light coupling means 20 and its neighborhood in FIG. 3.

In the drawing FIG. 1, briefly, a flat panel type light source "FLS" composes a first light transmission panel 10, a second light transmission panel 30 and a light coupling means 20. The first light transmission panel 10 is used for illumination and the second light transmission panel 30 is used only for bypass light guide. The light coupling means 20 makes optically a light coupling between the first and second light transmission panels 10, 30. The first light transmission panel 10 emits or projects light rays from its surface. The first light transmission panel 10 illuminates a transmissive object "OJ" such as photographic film, liquid crystal display device. Therefore an observer "OS" can see pattern "PT" or visual information which is displayed on the object "OJ" even in dark place.

Figure 4:
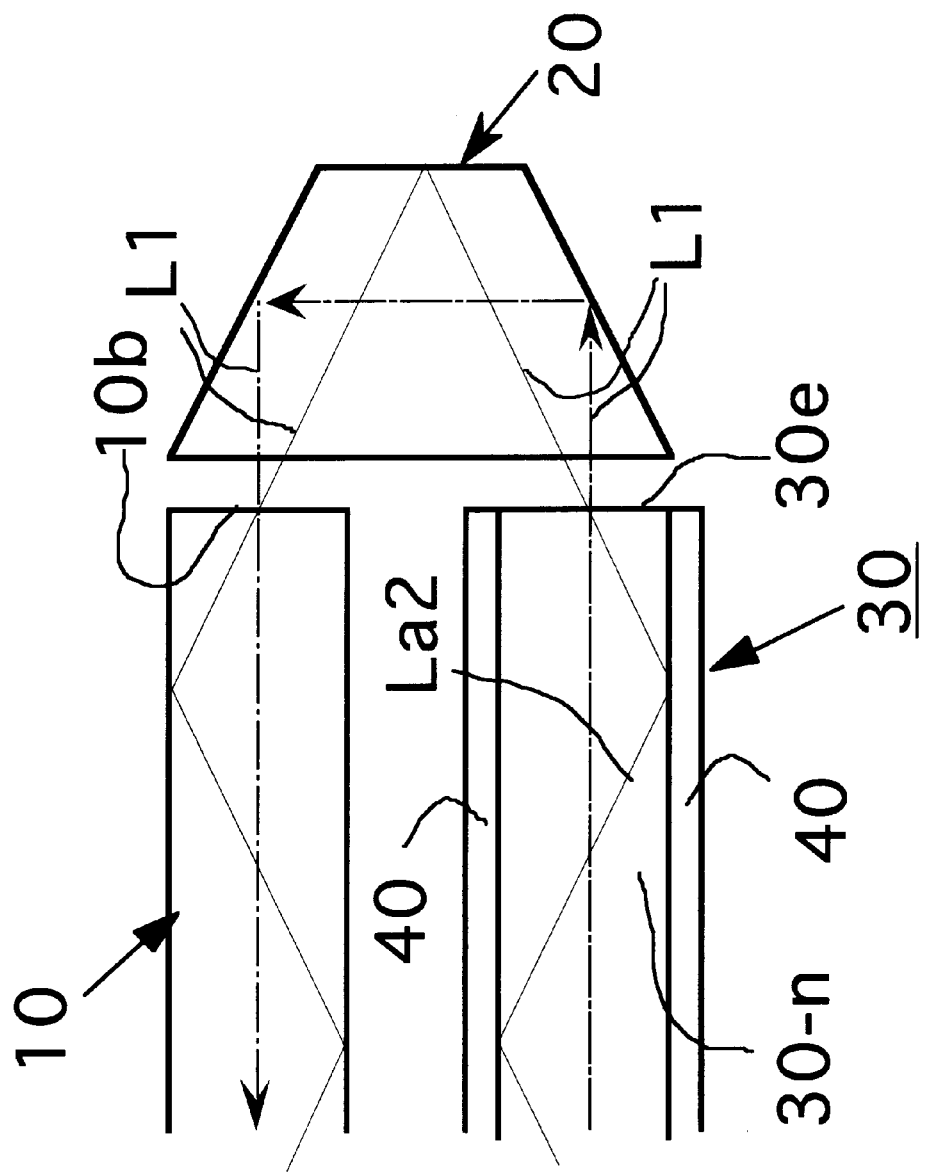
FIG. 4 is an enlarged side elevational, partially omitted and cross-sectional view, more enlarged than FIG. 3, showing a light coupling means 20 and its neighborhood in FIG. 3 and also showing light transmission passage way "L1", in which the light coupling means 20 is composed of a trapezoid-shaped prism.

In the drawings FIG. 2, FIG. 3 and FIG. 4, the flat panel type light source FLS composes basically a first light transmission panel (or film) 10, a second light transmission panel (or film) 30 (30-n, wherein "n"=1, 2, . . . ) and a light coupling means 20. The first light transmission panel 10 is located adjacently in parallel with the second light transmission panel 30. The light source "LS" is located near or adjacent to a pair of side terminals 10a, 30d in both light transmission panels 10, 30. The light coupling means 20 is located near or adjacent to another pair of side terminals 10b, 30e, distant from the pair of side terminals 10a, 30d in both light transmission panels 10, 30, to which the incident light rays are input. Both of the light transmission panels 10, 30 have relatively high refractive index and relatively high light transmission characteristics. The first light transmission panel 10 is used for illumination and the second light transmission panel 30 is used for bypass light guide. The light coupling means 20 makes optically a light coupling between the first and second light transmission panels 10, 30.

In order to obtain an efficient light transmission from the side terminal 30d to the opposite side terminal 30e of the second light transmission panel 30 with minimized leakage of light rays, the second light transmission panel 30 is preferably composed of a plurality of optical cores 30-n (wherein, "n"=1, 2, . . . ) as independent optical passageways and a common light transmission panel 40, in which the optical cores 30-n with high reflactive index and high transmission characteristics are embeded into the light transmission panel 40 with relatively low refractive index and high transmission characteristics, of which detail is explained later referring to FIG. 9.

For the light source "LS", a straight line type light source may be used such as a tubular fluorescent lamp, tubular incandescent lamp, etc. The incident light rays "La1", "Lb2" projecting from the light source "LS" are input into the side terminal 10a and the side terminal 30d in the both panels 10, 30.

As transparent members suitable for the light transmission panel 10 and the light coupling means 20, transparent organic materials may be used such as acrylic resin or poly methyl methacrylate resin (PMMA), polycarbonate resin (PC), polystyrene (PS) resin, etc. or transparent inorganic materials such as optical glass.

In FIG. 2, directions of light rays to be transmitted are shown roughly. The light source "LS" generates light rays "La1" and "Lb1". A group of light rays "Lb1" are projected to the side terminal 10a of first panel 10, so as to be indicated as dotted line with arrow mark to show transmitting direction of light rays "Lb1". The light rays "Lb1" are input to the first panel 10 and become light rays "Lb2". The light rays "Lb2" transmit inside the first panel 10 to direction of arrow mark. Another group of light rays "La1" are projected to the side terminal 30d of second panel 30, so indicated as dotted line with arrow mark to show transmitting direction of light rays La1. The incident light rays "La1" into the second panel 30 become light rays "La2". The light rays "La2", transmit inside the second panel 30 to the another or opposite side terminal 30e, so indicated as dotted line with arrow mark to show transmitting direction of light rays "La2". The light rays "La2" are output from the opposite side terminal 30e of second panel 30 and become light rays "La3". The light rays "La3" are project into the light coupling means 20 in which transmitting direction is changed to reverse. Output light rays "La4" from the light coupling means 20 are projected to the side terminal 10b of the first panel 10 and light rays "La4", become light rays "La5". The light rays "La5" transmit inside the first panel 10 from the side terminal 10b to another side terminal 10b of the first panel 10.

It must be noted that in the first light transmission panel 10, it is necessary for the light rays to output in suitable brightness and suitable distribution of brightness from the surface of the first light transmission panel 10 to outside, while in the second light transmission panel 30, it is necessary for the light rays not to output as much as possible to outside from the surface of the second light transmission panel 30.

Referring to FIG. 3 and FIG. 4 again, the light rays to be input into the first light panel 10 from the side terminal for light input 10a are transmitting toward the opposite side terminal 10b, and the transmitting light rays are output little by little to outside from the surface in the first light panel 10.

Referring to FIG. 4 again, after repeating multiple reflection in the second light transmission panel for bypass light guide 30, the light rays "L1" in the second light panel 30 are output or projected from the opposite side terminal 30d in the second light panel 30 to the light coupling means 20. And the light rays "L1" are received effectively at the light coupling means 20.

In this embodiment, the light coupling means 20 is indicated as pedestal (i.e. trapezoid)- shaped optical prism in which the light rays "L1" change its direction by at least one time of internal reflection of light rays. After changing direction, the light rays "L1" are output or projected from the light coupling means 20 to the opposite side terminal 10b in the first light transmission panels for illumination 10 and are received effectively at the opposite side terminal 10b. Next, the light rays "L1" are transmitted to reverse direction repeating multiple reflection in the first light panel 10 toward the initial side terminal 10a in the first light panel 10. The transmitting light rays leaks and outputs little by little from the surface of first light transmission panels for illumination 10.

It is very important factor for the second light transmission panel for light guide 30 to transmit light rays effectively repeating multiple reflection according to principle of "Total Reflection" in FIBER OPTICS or LIGHT GUIDE with minimized leakage or with the least transmission loss of light rays from the one end of terminal 30d to the opposite end of terminal 30e. On the other hand, the first light transmission panel for illumination 10 must cause leakage of suitable amount of incident light rays outside the surfaces of the first light panel 10 to output light rays for illumination.

Referring to FIG. 9, the second light transmission panel for light guide 30 may preferably be composed of a plurality of optical cores 30-1, . . . , & 30-n, and a common (or single) light transmission panel 40 The each optical core has relatively high refractive index and relatively high light transmission characteristics, while the light transmission panel 40 has lower refractive index than the cores and relatively high light transmission characteristics. All the plurality of optical cores 30-1, . . . , & 30-n are burned or embeded into the common light transmission panel 40 and they are aligned in a line in the light transmission panel 40, as clearly shown in FIG. 9. The same transparent materials as used for the first light transmission panels 10 and the light coupling means 20 may be suitably selected as transparent members for the cores 30-1, . . . , & 30-n and the light transmission panels 40, for reflative index of the cores to be higher than reflative index of the light transmission panel 40.

After being output from the opposite side terminal 30e, the light rays "L1" are input to the light coupling means 20 composed of pedestal-shaped prism in this embodiment and they are reflected and change their direction inside the light coupling means 20. The light rays "L1" changing direction are input from the opposite side terminal 10b into the first light transmission panel 10 for illumination and are transmitted by reflecting repeatedly toward the another side terminal 10a where the light source "LS" is located, and also the light rays "L1" leak or output outside little by little, gradually and they "L1" become outgoing or scattering light rays and next diffusing light rays.

In this preferred embodiment of this invention, the second light transmission panel for bypass light guide 30 has such function that almost incident light rays do not leak outside, different from the first light transmission panel for illumination 110. It should be noted that this function is equivalent to such that an additional light source with similar characteristics exists to as if an actual light source exists also at the opposite side terminal 10b, far from the another side terminal 10a at which an actual light source exists.

Therefore, this embodiment of the invention can provide such flat panel light source "FLS" that has uniform brightness in almost whole area of the front surface for example with large size of the surface and light weight, by utilizing only one and common light source "LS" for both of the first and second light panels 10 and 30. While conventional flat panel light source in the prior arts requires two light sources to obtain similar effect.

FIGS. 5A, 5B, 5C, 5D and 5E are schematic side elevational, partially omitted and cross-sectional views, showing various light incident optical means to the first light transmission panel 10 for illumination and the second light transmission panel 30 for bypass light guide from light source "LS", according to the embodiment of this invention.

In FIG. 5A, the light incident optical means comprises a tubular type fluorescent lamp "LS" and a reflector 94. The tubular type fluorescent lamp "LS" is located near one side terminal of the first light panel 10 and one side terminal of the second light panel 30. The reflector 94 is located in the rear of the tubular type fluorescent lamp "LS". A conventional tubular type fluorescent lamp "LS", a cold cathode type or a hot cathode type can be used for the light source of the embodiment. This fluorescent lamp LS includes a glass tube "a" and a phosphor layer "b", in which the phosphor layer "b" is coated on all inner surface of the glass tube "a". Light rays generating from the fluorescent lamp "LS" are projected directly or reflecting in the reflector 94 to the side terminals of the first and second light panels 10, 30.

In FIG. 5B, the light incident optical means comprises a tubular type fluorescent lamp "LS", a reflector 94 located in the rear of the lamp "LS" and and the side terminals of both panels 10, 30. The light collector 92 is made from light transmission material of relatively high refractive index with pedestal shape in cross section. Light rays generating from the fluorescent lamp "LS" are projected to the side terminals of the first and second light panels 10, 30 through the light collector 92 by which light rays are effectively collected and focused to both side terminals of the first and second panels 10, 30.

In FIG. 5C, the light incident optical means comprises an aperture type fluorescent lamp "LS" with reflector 95. This fluorescent lamp "LS" includes a glass tube "a", a phosphor layer "b", a reflector 95 and an aperture or opening "c". The phosphor layer "b" is coated on all inner surface of the glass tube "a". The reflector 95 or reflecting metal coating such as aluminum is coated on an outer surface of the glass tube "a", without the aperture "c" in which the reflecting coating is omitted. Light rays generating from the aperture type fluorescent lamp "LS" are projected from the aperture "c" directly or reflecting in the reflector 95 to both side terminals of the first and second light panels 10, 30.

In FIG. 5D, the light incident optical means comprises a tubular type fluorescent lamp LS, an optical prism 98 of triangular shape in cross section and a reflector 96. The lamp "LS" is located near one side terminal of the first light transmission panel 10. The optical prism 98 is located near one side terminal of the second light transmission panel 30. Light rays generating from the lamp "LS" are projected to one side terminals of the first light panel 10 and a surface of the prism 98. Light rays input inside the prism 98 changes their direction and output from another surface of the prism 98 to project one side terminals of the second light panel 30.

In FIG. 5E, a light incident optical means comprises a tubular type fluorescent lamp LS, an optical prism 97 and a reflector 98, similar to that shown in FIG. 5E, except that the lamp "LS" and an optical prism 98 turn reversely in their position.

FIG. 6 is a graphs showing distribution characteristics of brightness on the surface of first light transmission panel 10 according to the embodiment of the invention.

FIG. 7 is a graph showing distribution characteristics of brightness on the surface of first light transmission panel 10 in case one lamp source is used according to a prior art.

FIG. 8 is a graph showing distribution characteristics of brightness on the surface of first light transmission panel 10 in case two lamps source are used according to another prior art.

In FIG. 6, FIG. 7 and FIG. 8, vertical axis indicates brightness on surface of first light transmission panel 10 and horizontal axis indicates position on the surface of first light transmission panel 10.

In the embodiment of the invention as shown in FIG. 6, brightness on the surface of first light transmission panel 10 is relatively uniform characteristics in any spots on surface of first light transmission panel 10 between one side terminal 10a and opposite side terminal 10b, in spite of using only one light source "LS".

On the contrary, in the prior art in case of using only one light source as shown in FIG. 7, brightness on the surface of first light transmission panel 10 is not uniform characteristics in any spots on surface of first light transmission panel 10 between one side terminal 10a and opposite side terminal 10b. In this case the brightness is greatly decreased according to position on surface of first light transmission panel 10.

In another prior art in case of using two light sources as shown in FIG. 8, brightness on the surface of first light transmission panel 10 is uniform characteristics in any spots on surface of first light transmission panel 10 between one side terminal 10a and opposite side terminal 10b, similar to the embodiment of the invention. But the prior art requires two light sources, while the embodiment requires only one light source to get similar uniform characteristics of brightness.

Referring to FIG. 10, FIG. 11, FIG. 12 and FIG. 13, other types of second light transmission panel 31, 32, 33 and 34 respectively are illustrated in detail, in which modifications are made to the first type of second light transmission panel 30 as shown in FIG. 9. The same explanation as mentioned referring to FIG. 9 is omitted as much as possible to simplify an explanation.

In FIG. 10, the second light transmission panel for bypass light guide 31 may be composed of a multiple of optical fibers 31-1, . . . , and 31-n and a panel 40. Each optical fiber 31-1, . . . , or 31-n is consisting of an optical "CORE" 31a with high refractive index (and high transmission characteristics) and an optical "CLADDING" (SHEATH) 31b with low refractive index (and high transmission characteristics). The multiple of optical fibers 31-1, . . . , and 31-n are buried in the light transmission panel 40 and are aligned in a line in the panel 40. In this case, each optical core 31a has an independent cladding 31b, while the multiple of optical cores 30-1, . . . , and 30-n have a common (i.e. single) optical "CLADDING" with relatively low refractive index 40 in stead of independent cladding in the case of the second light transmission panel 30 in FIG. 9

Figure 11:
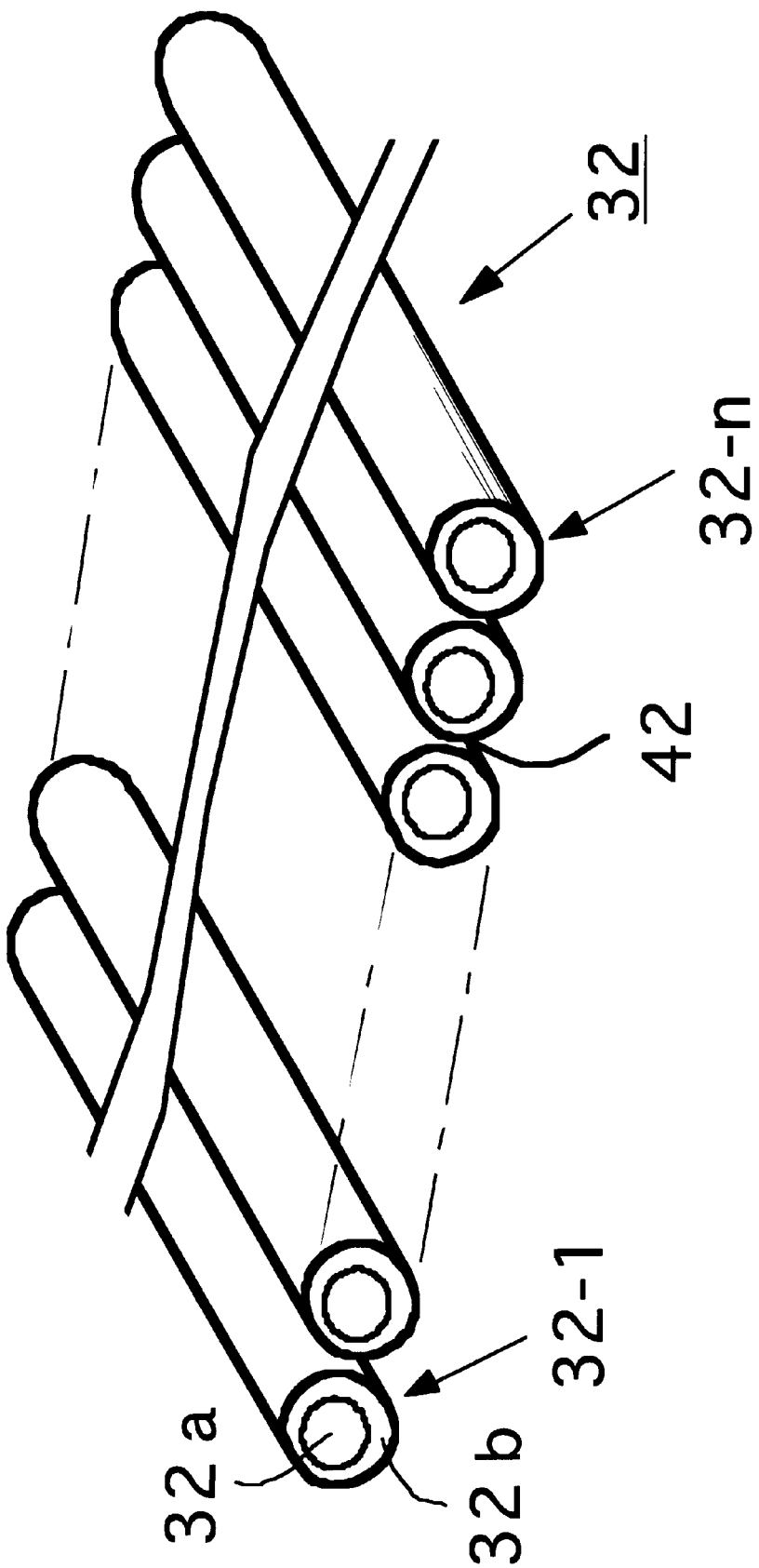
FIG. 11 is a partly omitted schematic perspective view of other second light transmission panel 32 using a third type of multiple optical fibers.

In FIG. 11, the second light transmission panel for bypass light guide 32 may be composed of a multiple of optical fibers 32-1, . . . , and 32-n and adhesives 42. The two adjacent optical fibers are bonded together and the optical fibers 32-1, . . . , and 32-n are aligned in a line. Each optical fiber 32-1, . . . , and 32-n is consisting of an optical "CORE" with high refractive index and an optical "CLADDING" (li.e. SHEATH) with low refractive index, similar to FIG. 10.

Figure 12:
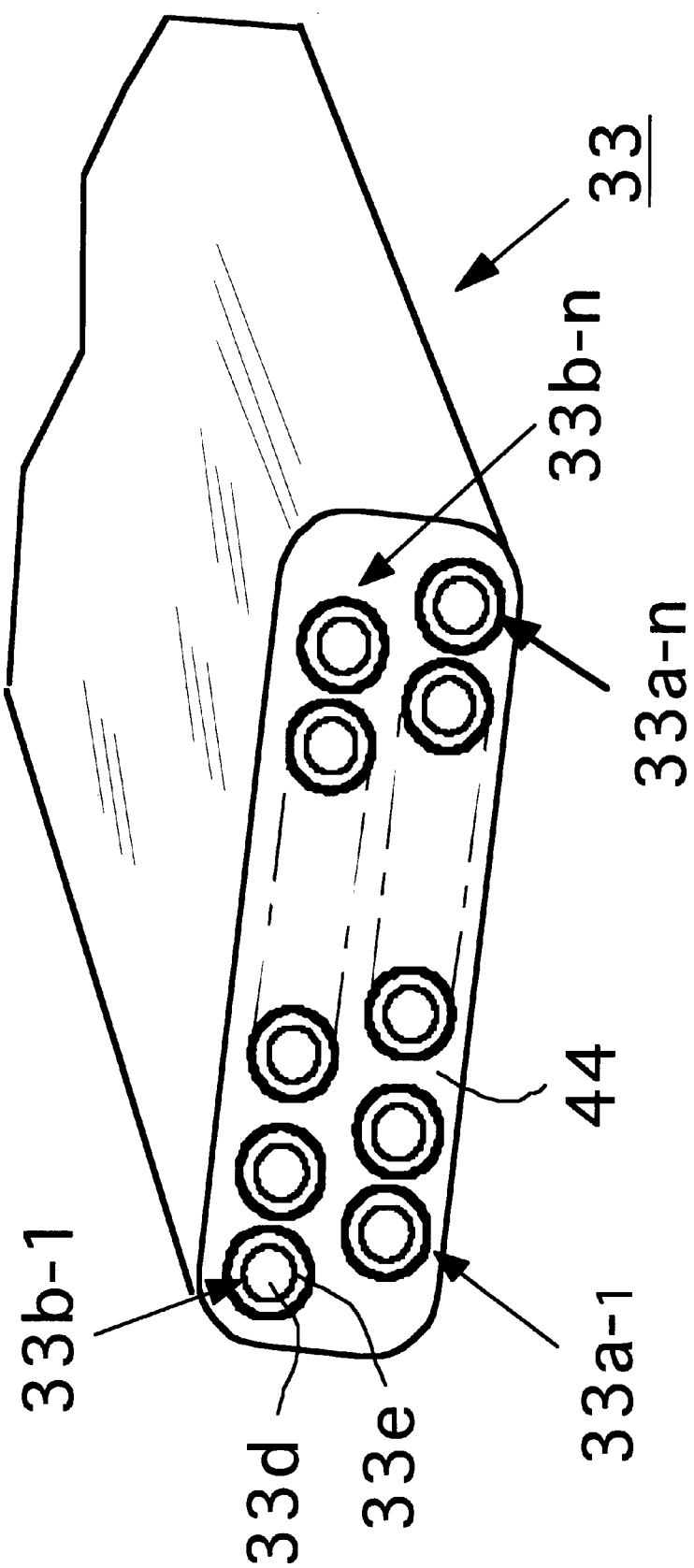
FIG. 12 is a partly omitted schematic perspective view of still other second light transmission panel 33 using a fourth type of multiple optical fibers.

In FIG. 12, the second light transmission panel for bypass light guide 33 may be composed of a multiple of optical fibers (33a-1, . . . , & 33a–n) and (33b-1, . . . , & 33b–n) and a panel 44. At least two lines of optical fibers (a first line; 33a-1, . . . , & 33a–n and a second lline; 33b-1, . . . , & 33b–n) are buried in a panel 44. Each optical fiber is consisting of an optical "CORE" with high refractive index and an optical "CLADDING" (li.e. SHEATH) with low refractive index.

Figure 13:
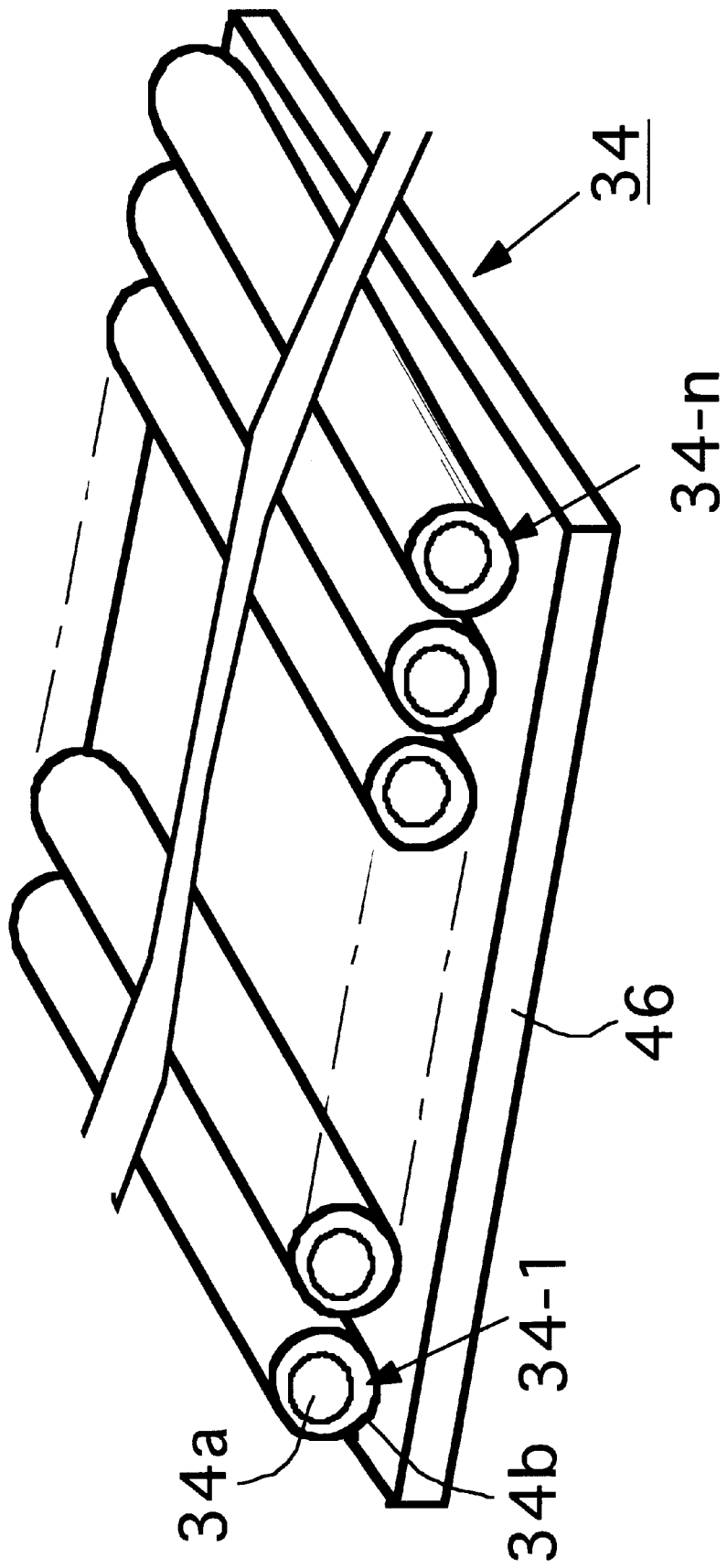
FIG. 13 is a partly omitted schematic perspective view of further second light transmission panel 34 using a fifth type of optical fibers.

In FIG. 13, the second light transmission panel for bypass light guide 34 may be composed of a multiple of optical fibers 34-1, . . . , and 34-n and a common supporting panel 46. The optical fibers 34-1, . . . , and 34-n are aligned in a line and fixed on the supporting panel 46 by coating of adhesives. Each optical fiber 34-1, . . . , or 34-n may be consisting of a CORE with high refractive index and a CLADDING (SHEATH) with low refractive index.

Figure 14:
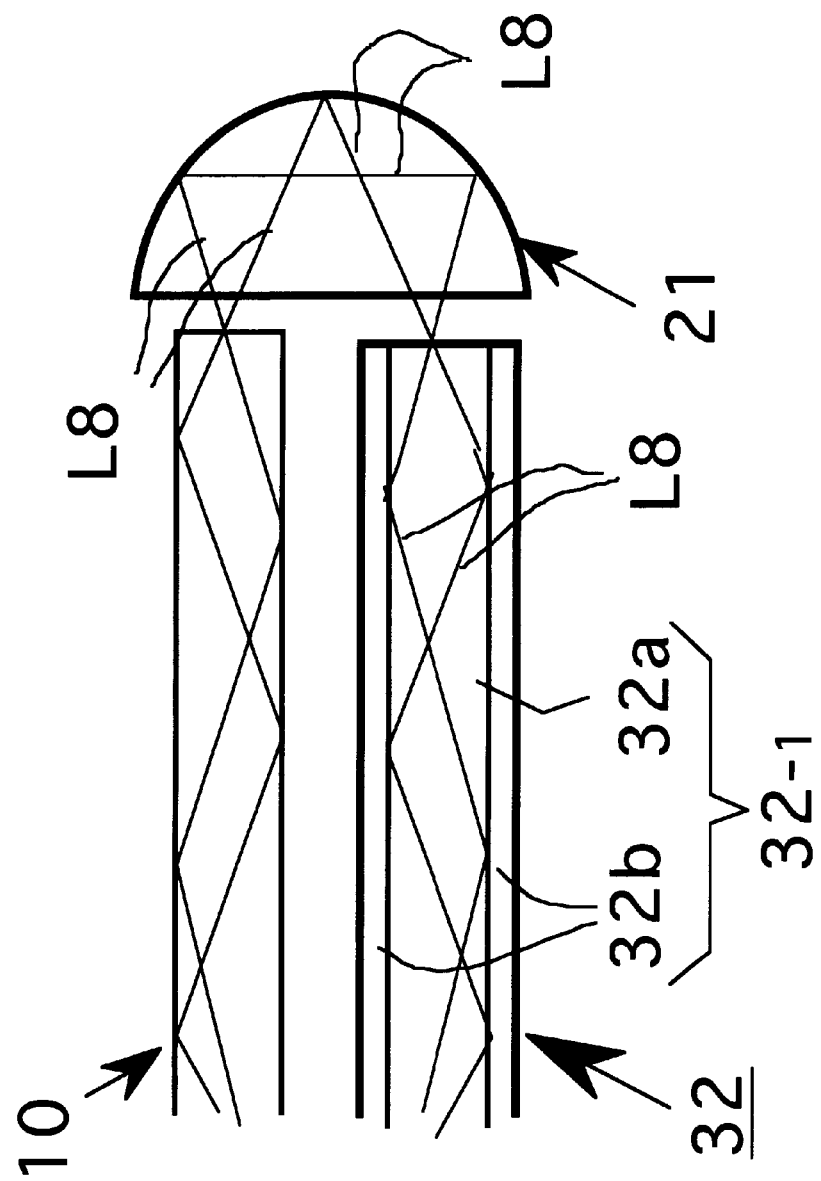
FIG. 14 is a side elevational, partially omitted and cross-sectional view, showing a light coupling means 21 and its neighborhood and also light transmission passageways "L8", in which the light coupling means 21 is composed of a half circle-shaped prism, according to another preferred embodiment of this invention.

FIG. 14 shows a modification to the first preferred embodiment as shown in FIG. 1 to FIG. 4. In FIG. 14, a light coupling means 21 is composed of a light transmission panel of half circle in cross section (i.e. half circle-shaped prism). This embodiment includes the first light transmission panel 10, the second light transmission panel 32 with the multiple optical fibers 32-1, . . . , and 32-n as shown in FIG. 11 and the half circle-shaped prism 21. A reference character "L8" indicates light passageways from the second panel 32 to the half circle-shaped prism 21 and from the prism 21 to the first panel 10. The second light transmission panel 32 may substitute for the second light transmission panel 30 (FIG. 9), 31 (FIG. 10), 33 (FIG. 12), or 34 (FIG. 13).

Figure 15:
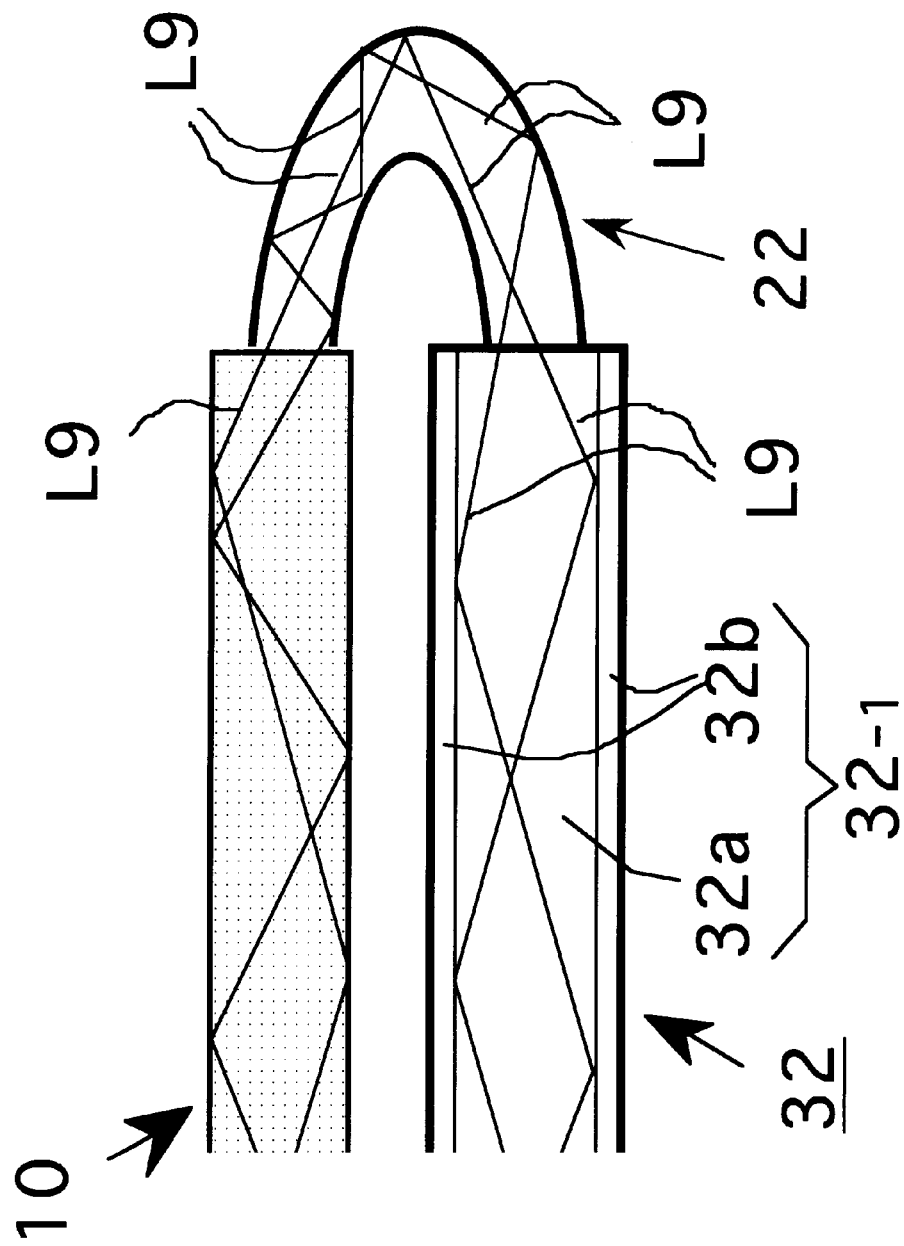
FIG. 15 is a side elevational, partially omitted and cross-sectional view, showing a light coupling means 22 and its neighborhood and also light transmission passage way L9, in which the light coupling means 22 is composed of a character "U"-shaped prism, according to other preferred embodiment of this invention.

In further modification illustrated in FIG. 15, a light coupling means 22 is composed of a curved light transmission panel of a character "U" shaped (U- shaped prism 22), rotating by 90 degree anti-clock wise. This embodiment may includes the first light transmission panel 10, the second light transmission panel 32 with the optical fibers 32-1, . . . ,and 32-n as shown in FIG. 11 and the U-shaped prism 22. A reference character "L9" indicates light passageways from the second panel 32 to the U- shaped prism 22 and from the U- shaped prism 22 to the first panel 10.

Figure 16:
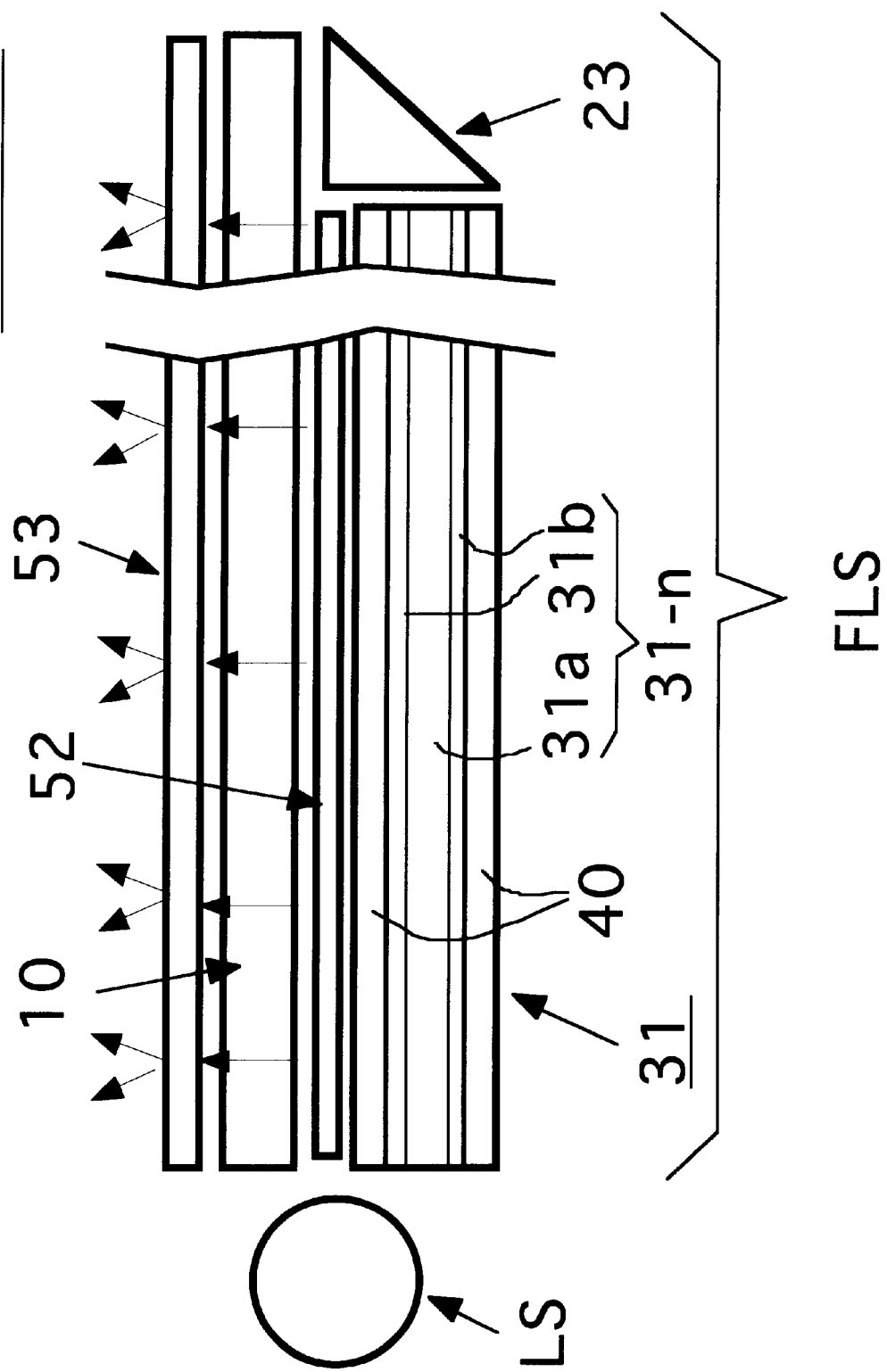
FIG. 16 is a side elevational, partially omitted and cross-sectional view, showing a flat panel type light source "FLS", according to further preferred embodiment of this invention.
Figure 17:
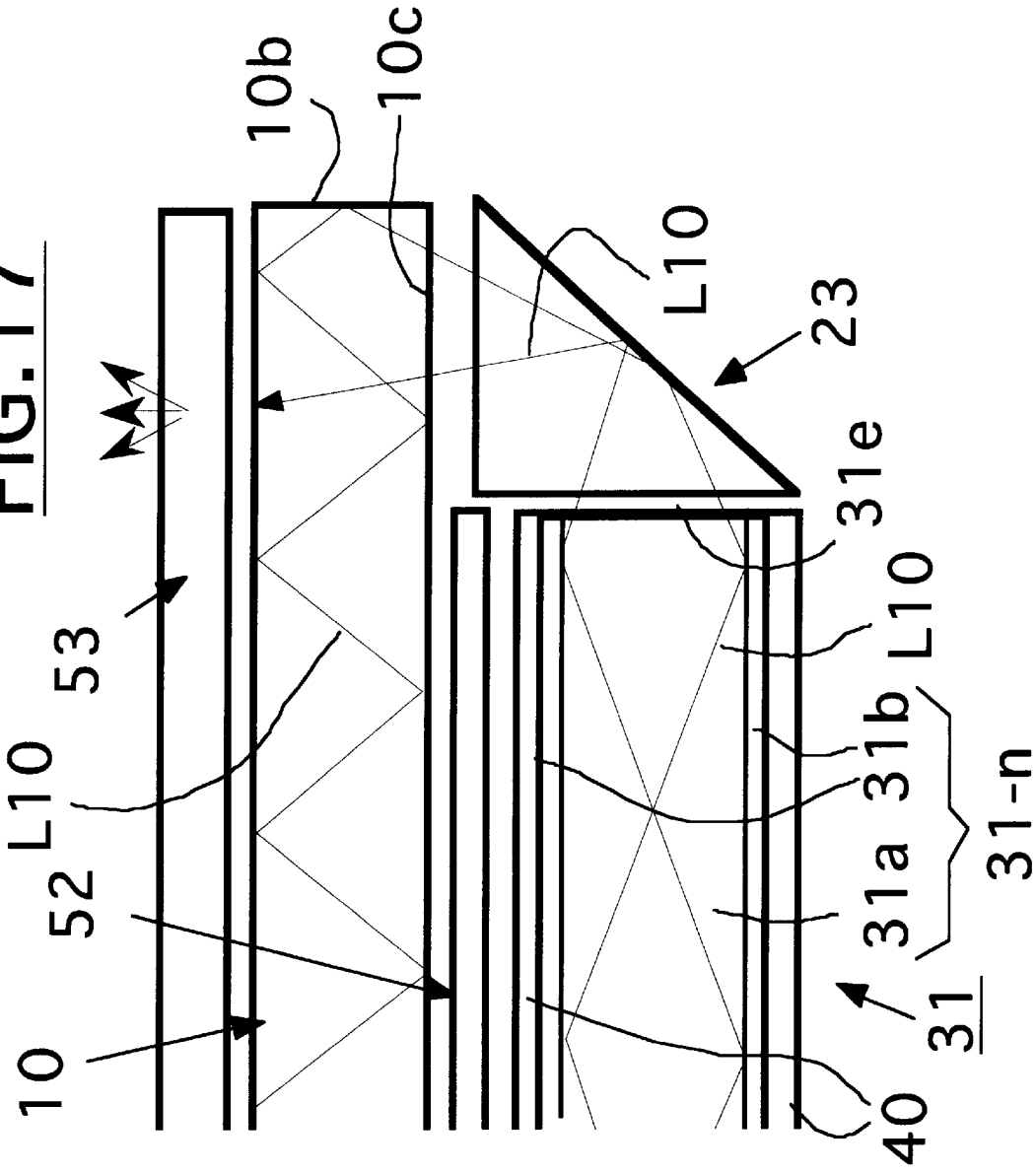
FIG. 17 is an enlarged side elevational, partially omitted and cross-sectional view, more enlarged than FIG. 16, showing a light coupling means 23 and its neighborhood and also light transmission passageways L10, in which the light coupling means 23 is composed of a rectangular -shaped prism; and, FIG. 18 is a side elevational, partially omitted and cross-sectional view, showing a light coupling means 24 and its neighborhood and also light transmission passage way L11, in which the light coupling means 24 is composed of a character "U"-shaped prism extending from a second light transmission panel according to other preferred embodiment of this invention.

Referring to FIG. 16 and FIG. 17, a flat type light source "FLS" of other preferred embodiment is shown, in which FIG. 16 is a side elevational, partially omitted and cross-sectional view and FIG. 17 is an enlarged side elevational, partially omitted and cross-sectional view showing a light coupling means 23 of triangular-shaped prism in cross-section and its neighborhood in FIG. 16 and also showing light transmission passageways "L10".

As shown in FIG. 16 and/or FIG. 17, the flat type light source "FLS" may be composed of a second light transmission panel for bypass light guide 31 as shown in FIG. 10, a light scattering panel 52, the first light transmission panel for illumination 10 as explained before and a light diffusing panel 53. The second light transmission panel 31 may have the multiple of optical fibers 31-n with a core 31a and a claddings 31b in each optical fiber, which are embeded into a common flat panel 40, as shown in FIG. 10. The components 31, 52, 10 and 53 are positioned in these order from bottom to top and located adjacently each other. A common straight-line light source "LS" of a tubular fluorescent lamp is located near a side terminal of the first light transmission panel 10 and a side terminal of the second light transmission panels 31. Incident light rays projecting from the light source "LS" are input into the both side terminals of the both panels 10 & 31.

In this embodiment different from the first one, the second light transmission panels 31 is shorter than the first light transmission panel 10, so that an opposite side terminal 31e in the second light transmission panel 31 is terminated in shorter position than an opposite side terminal 10b in the first light transmission panels 10. Further, in this embodiment, a column prism with triangular section is used for a light coupling means 23 different from the first embodiment. A side of the triangular prism 23 is adjacently positioned at the opposite side terminal 31e in the second light transmission panels 31. Another side of the triangular prism 21 is adjacently positioned at a part 10c of rear surface near the opposite side terminal 10b in the first light transmission panels 10. Therefore, almost incident light rays in the core portion 31a of the second light transmission panel 31 for bypass light guide are transmitted effectively with minimum leakage of light rays toward the opposite side terminal 31e, by reflecting repeatedly between the core and the cladding 31b within the second light transmission panel 31 for bypass light guide.

After the light rays L10 output from the opposite terminal 31e of the second panel 31, they input to the triangular prism 23 and they reflect and change their direction inside the triangular prism 23. The light rays L10 changing their direction input from a part 10c of the rear surface in the first light transmission panel 10 for illumination. Further, they L10 are transmitted by reflecting repeatedly toward the another side terminal 10a where the light source LS is located. Also the light rays L10 leak or output outside little by little gradually.

In this embodiment, because the triangular prism 23 for light coupling means can be suitably accommodated in rear of the first light transmission panel 10 as shown in FIG. 16 & 17 without extending to right side in the drawings, the flat panel light source FPL can have effective lighting surface of larger area including the light coupling means.

Referring to FIG. 18 is an enlarged side elevational, partially omitted and cross-sectional view, showing the light coupling means 24 and its neighborhood and also light transmission passageways L11. In FIG. 18, the second light transmission panel 50 is basically composed of either one of light transmission panel with optical fibers 30 (FIG. 9), 31 (FIG. 10), 32 (FIG. 11), 33 (FIG. 12) and 34 (FIG. 13). In this embodiment, the second light transmission panel 50 is extended and curved in the opposite terminal side, in order to form the light coupling means 24 with a character "U"-shape. That is, the light coupling means 24 has similar shape to a handle of umbrella in cross-section, extending from the second light transmission panel 50 similar shape to a shaft of the umbrella in cross-section.

While certain preferred embodiments of the present invention have been disclosed in detail, it is to be understood that various modifications, changes and combinations may be made without departing from the spirit of the invention or the scope of the following claims.

What is claimed is:

1. A flat light source, comprising:
   a first light transmission means, being for use for illumination only, and having a major surface;
   a second light transmission means, being for use as bypass light guide only, including at least one light guide;
   a light direction changing means, wherein light rays being output from said second light transmission means are changed in direction in order to be input into said first light transmission means; and,
   wherein said light rays being input into said first light transmission means from said second light transmission means are output outside for surface illumination from said major surface of said first light transmission means.

2. The flat light source, according to claim 1:
   wherein said light direction changing means is composed of a transparent optical element with relatively high refractive index and relatively high light transmission characteristics.

3. The flat light source, according to claim 2:
   wherein said transparent optical element has a cross-sectional shape selected from a group of a trapezoidal shape, a triangular shape, a half-circular shape and a "U" shape.

4. The flat light source, according to claim 1, further comprising:
   said first light transmission means, having a first side terminal surface;
   said second light transmission means, having a second side terminal surface; and, a light generating means, generating light rays in order to project said light rays to said first side terminal surface and/or said second side terminal surface.

5. The flat light source, according to claim 4:

wherein said light generating means is composed of a light.

6. A flat light source, comprising:

a first light transmission means, being for use for illumination only;

a second light transmission means, being for use as bypass light guide only, including a plurality of light guides;

a light direction changing means, wherein light rays being output from said second light transmission means are changed in direction in order to be input into said first light transmission means;

wherein said first light transmission means is composed of a light transmission panel having at least one major surface and at least one side terminal surface, so that incident light rays input from said side terminal surface are leaked from said major surface; and wherein said second light transmission means is composed of said plurality of light guides including a plurality of optical fibers, in which each said optical fiber has at least a core with relatively high refractive index, an input terminal and an output terminal.

7. The flat light source, according to claim 6:

wherein said optical fibers are aligned in at least one line.

8. The flat light source, according to claim 6:

wherein each of said optical fibers is composed of a core; wherein all said cores are embedded into a light transmission member with lower refractive index than said cores, in which said cores are separately positioned each other; and wherein said cores are aligned in at least one line.

9. The flat light source, according to claim 6:

wherein each of said optical fibers is composed of a core with relatively high refractive index and a cladding with lower refractive index than said core; and wherein said optical fibers are aligned in at least one line.

10. The flat light source, according to claim 6:

wherein each of said optical fibers is composed of a core with relatively high refractive index and a cladding with lower refractive index than said core;

wherein said optical fibers are aligned in one line or more than two lines; and wherein said optical fibers are embedded into a supporting member.

11. The flat light source, according to claim 6:

wherein each of said optical fibers is composed of a core with relatively high refractive index and a cladding with lower refractive index than said core; and wherein said optical fibers are bonded together, so that said optical fibers are aligned in at least one line.

12. The flat light source, according to claim 11:

wherein said optical fibers are adjacently bonded together by adhesives.

13. The flat light source, according to claim 6:

wherein each of said optical fibers is composed of a core with relatively high refractive index and a cladding with lower refractive index than said core; and wherein said optical fibers are fixed on a supporting member by coating of adhesives.

14. The flat light source, according to claim 6:

said first light transmission means, having a first side terminal surface;

said second light transmission means, having a second side terminal surface; and, a light generating means, generating light rays in order to project said light rays to said first side terminal surface and/or said second side terminal surface.

15. The flat light source, according to claim 14:

wherein said light generating means is composed of a light.

16. The flat light source, according to claim 6:

wherein said light rays being input into said first light transmission means from said second light transmission means are output outside for surface illumination from said major surface of said first light transmission means.

17. A flat light source, comprising:

a substantially flat first light transmission panel for illumination, a substantially flat second light transmission panel for bypass light guide, being adjacent to said first light transmission panel and substantially in parallel with said first light transmission panel;

a prism, being adjacently to said first and second light transmission panels and making optical coupling with said first and second light transmission panels; and, wherein said first light transmission panel and/or said second light transmission panel receive/receives light rays from a light generating means and transmit/transmits said light rays internally substantially an entire length of said first light transmission panel and/or said second light transmission panel.

18. The passive display, according to claim 1: said passive display comprising:

a flat panel type passive display; and, said flat light source.

19. The passive display, according to claim 18:

wherein said flat panel type passive display device is composed of a liquid crystal display device.

20. The flat light source, according to claim 17:

wherein said prism changes direction of said light rays in order to input said light rays into said first transmission panel and/or said second light transmission panel.

21. A light guide with light leakage function, comprising:

(a) a leakage light guide means, having at least one first light guide portion and at least one first major surface, used for leaking light from said first major surface along a first length of said first light guide portion; and, (b) a second light guide means, having at least one second light guide portion and at least one second major surface, used only for bypassing said light along a second length of said second light guide portion.

22. The light guide with light leakage function, according to claim 21:

(a) said first light guide portion, having a first terminal part;

(b) said second light guide portion, having a second terminal part; and, (c) a light communication means, in order to communicate optically between said first terminal part and said second terminal part.

23. The light guide with light leakage function, according to claim 22:

(a) said light communication means is composed of at least one transparent optical means.

24. The light guide with light leakage function, according to claim 23:

(a) wherein said transparent optical means is composed of at least one optical prism.

25. The light guide with light leakage function, according to claim 21:

(a) said second light guide portion, having at least one substantially light reflective means; and, (b) said light reflective means is selected from the group consisting of at least one transmissible layer with lower refractive index than said second light guide portion and at least one light reflective metal layer.

* * * * *